Patented Nov. 27, 1951

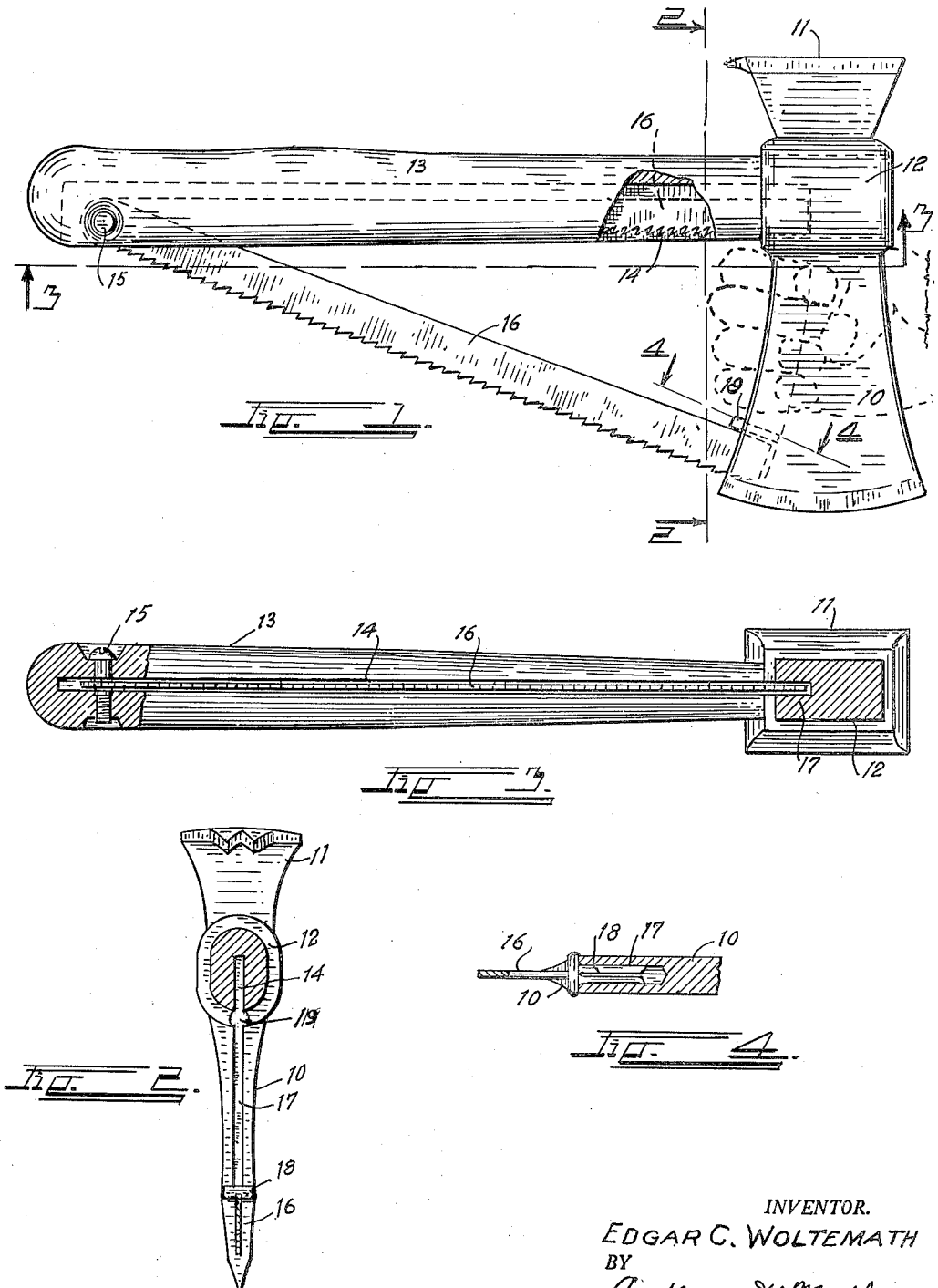

2,576,869

UNITED STATES PATENT OFFICE 2,576,869

COMBINATION HAND AX AND SAW

Edgar C. Woltemath, Denver, Colo.

Application December 3, 1949, Serial No. 130,876

2 Claims. (Cl. 145—31)

This invention relates to improvements in combination tools and has reference more particularly to a foldable hand saw.

Hunters, campers, automobilists and many others find frequent use for a hand ax and therefore, as a rule, include this tool in their equipment. It often happens that a saw is the proper tool indicated, and in its absence the work is done with the ax, with unsatisfactory results.

It is the object of this invention to produce a hand ax or hatchet having combined therewith a saw blade pivoted to the ax handle near its end, foldable into the handle and guided by a groove in the ax head.

The above and any other objects that may appear as the description proceeds are attained by a construction and an arrangement of parts that will now be described in detail; reference for which purpose will be had to the accompanying drawing in which the invention has been illustrated and in which:

Figure 1 shows a side elevation of the invention, parts being broken away to better disclose the construction;

Figure 2 is a view partly in section, taken on line 2—2, Figure 1;

Figure 3 is a view, partly in section, taken on line 3—3, Figure 1; and

Figure 4 is a section taken on line 4—4, Figure 1.

In the drawing reference numeral 10 designates the blade portion of a hand ax and 11 the hammer head. A handle socket 12 is provided in the usual manner. A handle 13 has one end secured in the socket, forming with the head a hand ax of usual construction. The handle may be of wood or of metal, but for the purpose of this description it will be considered as made from metal. The handle is provided with a narrow slot 14 extending substantially the entire length thereof. A pivot screw 15 is positioned in the handle near its outer end and serves as a pivot for saw blade 16. The slot is of such depth that when the saw blade is folded into the handle, as indicated by the dotted line showing in Figure 1, the teeth will be safely within the slot.

The edge of the ax blade facing the handle is curved on the arc of a circle whose pivot point is the axis of screw 15, and is provided with a slot 17 slightly wider than the thickness of the saw and the free end of the latter extends into slot 17 and is guided thereby.

When the saw is to be used it is moved into the full line position shown in Figure 1 and held in that position by a split pin 18 for which a hole has been provided as shown in Figure 2. When the saw blade is folded into the handle, pin 18 is transferred to hole 19. Since pin 18 has an enlarged head 20, it can readily be inserted and removed. Any other suitable latching means may be substituted for the one shown, which is intended to represent means broadly.

When the saw blade is folded into the handle the ax is suitable for use in the ordinary way. When a saw is needed, the blade is brought into the operative position shown in Figure 1 and latched by pin 18 or other suitable means. The ax head should be designed in such a way that it will serve as a hand grip when the saw is used.

Attention is called to the fact that the edge of the ax is grooved for the reception of the end of the saw blade, which is therefore held quite securely against forces tending to move it transversely.

Having described the invention, what I claim as new is:

1. A foldable saw comprising an elongated handle provided at one end with a hand grip, the handle and the hand grip having a continuous groove, a saw blade positioned in the groove, the saw blade being pivoted to the handle near the outer end thereof, the saw blade, when in operative position, having its free end positioned in the groove in the hand grip, the groove in the hand grip being curved about the pivot of the saw, a stop for limiting the outward movement of the saw in the hand grip groove, the saw blade being foldable into the groove in the handle so as to be entirely within the outlines thereof, and means for latching the blade in both its operative and inoperative positions.

2. A foldable saw in accordance with claim 1 in which the hand grip is widened in the plane of the groove and has the edge facing the saw pivot curved on an arc concentric with said pivot and provided with a groove for the reception of the movable end of the saw, the length of the saw being such that its movable end always projects into the groove in the handgrip.

EDGAR C. WOLTEMATH.

REFERENCES CITED

The following references are of record in the file of this patent:

UNITED STATES PATENTS

| Number | Name | Date |
|---|---|---|
| 263,104 | Bickel | Aug. 22, 1882 |
| 292,184 | Thompson | Jan. 22, 1884 |
| 784,674 | Haag | Mar. 14, 1905 |
| 806,515 | Baumgartner | Dec. 5, 1905 |

FOREIGN PATENTS

| Number | Country | Date |
|---|---|---|
| 47,836 | Austria | May 10, 1911 |